Patented Aug. 12, 1947

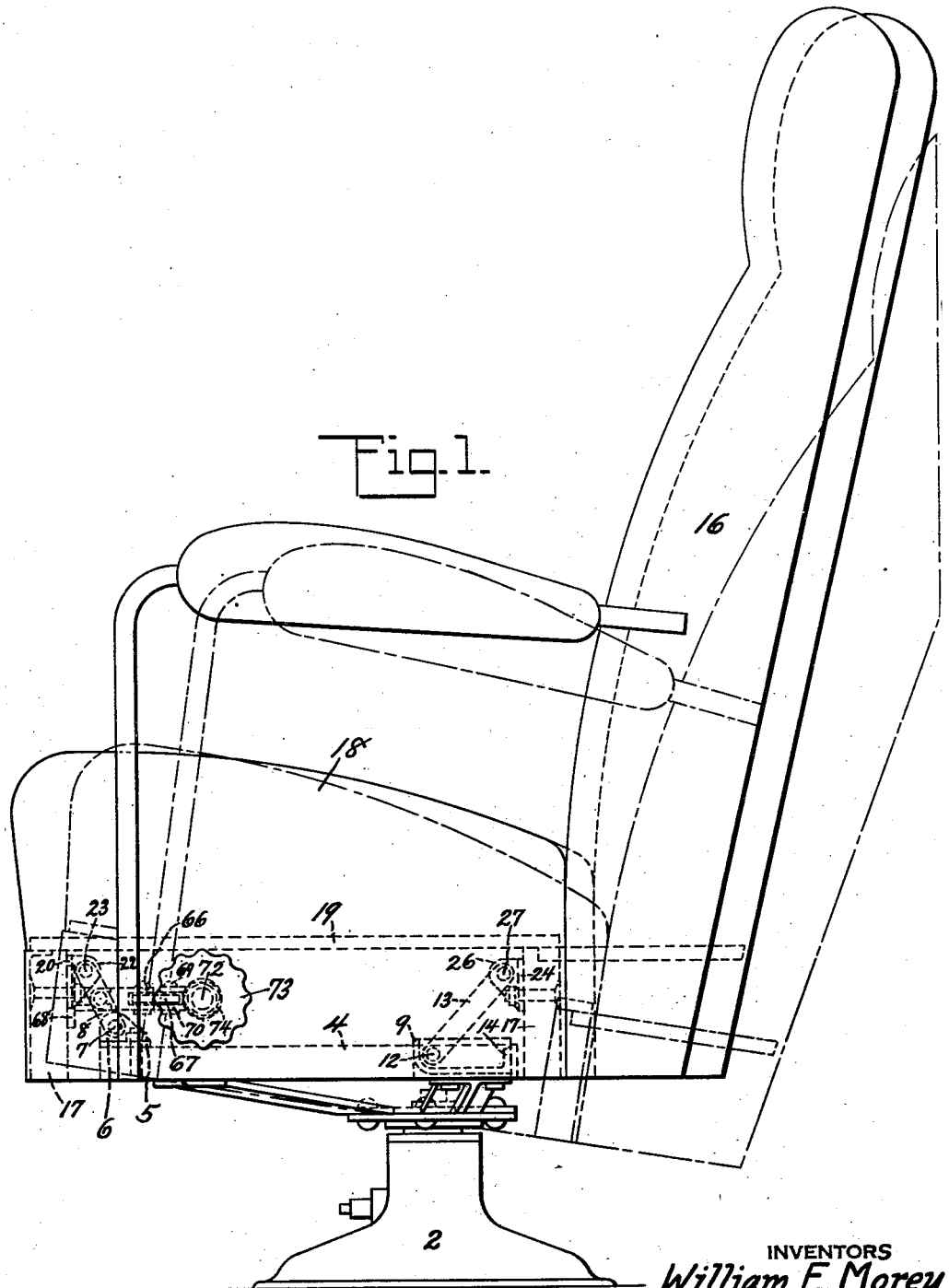

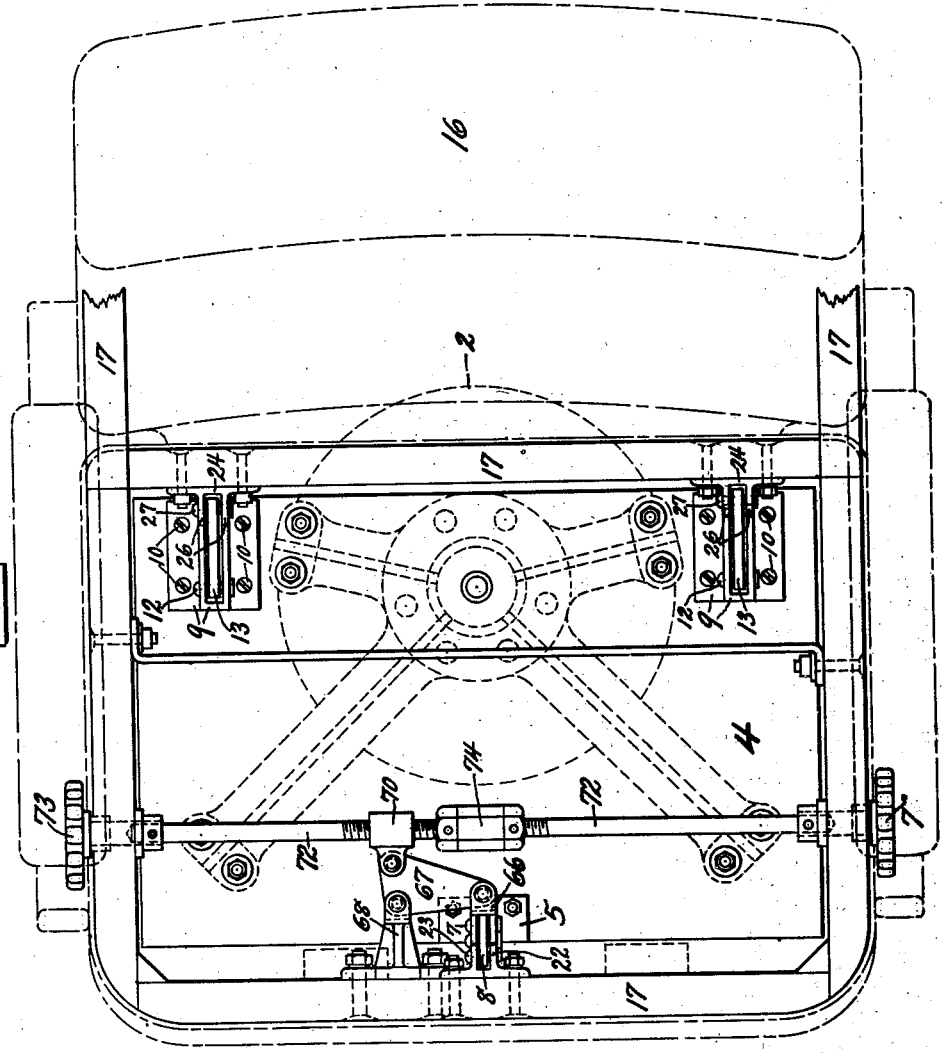

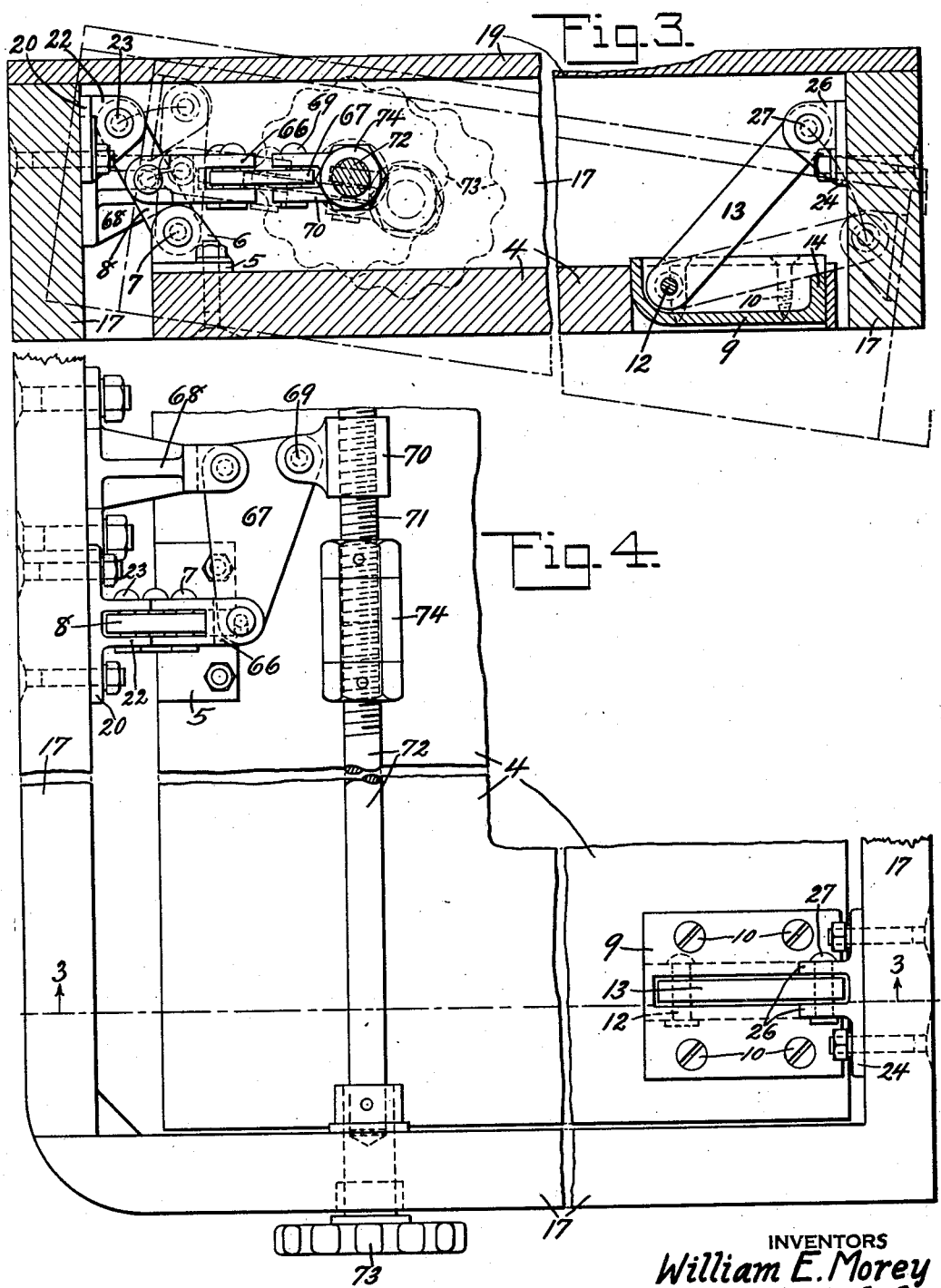

2,425,632

UNITED STATES PATENT OFFICE 2,425,632

RECLINING SEAT CONTROL

William E. Morey, Huntington, W. Va., and Ralph G. Nichols, Weldon Spring, Mo., assignors to American Car and Foundry Company, New York, N. Y., a corporation of New Jersey Original application November 18, 1939, Serial No. 305,054. Divided and this application December 15, 1942, Serial No. 469,054

5 Claims. (Cl. 155—116)

1

This invention relates to reclining seat controls in general and in particular to such seat controls for use in road or rail vehicles wherein the seat back and cushion move in unison to a reclining position, and is a division of our application for Reclining seat, Serial No. 305,054, filed November 18, 1939, and now Patent 2,319,743 granted May 18, 1943.

The majority of reclining seats now in use have the back portion movable relative to the cushion with the result that a person can only be in the most comfortable position at one point of seat back adjustment. As the seat back is inclined the angular relation between the passenger's legs and back varies and may vary to such a degree as to be very tiring to the passenger. The major reason for such discomfort to the passenger is due to the fact that in a number of the inclined positions the lower portion of the spine is not properly supported, this being due to the change in angular relation between the seat back and cushion. It has been proven by experiment that the greatest comfort is obtained when the seat back and cushion have a constant angular relationship, with the enclosed angle being approximately 90 degrees. It is an object, therefore, of the present invention to provide a reclining seat in which the seat back and the cushion are at a constant angular relation to each other.

A further object of the invention is the provision of a reclining seat in which the rear portion of the cushion lowers as the seat back assumes a more reclining position.

A still further object of the invention is the provision of a seat having the back and cushion rockably supported upon the seat base by means of links.

A yet further object of the invention is the provision of a reclining seat the motion of which may be accurately controlled by an extremely simple operating mechanism.

These and other objects of the invention will be apparent to persons skilled in the art from a study of the following description and accompanying drawings, in which:

Figure 1 is an end elevational view of the improved seat and disclosing the seat by full lines in normal position and by line and dash in the fully tilted or reclining position;

Fig. 2 is a plan view of the seat supporting and reclining mechanism;

Fig. 3 is a sectional view taken substantially on line 3—3 of Fig. 4, and

Fig. 4 is an enlarged partial plan view of the operating mechanism for controlling the reclining seat.

Referring now to the drawings in detail, it will be seen that the seat is revolvably supported upon a pedestal 2 by means of a seat base 4 which may revolve only in a substantially horizontal plane. The seat base may be constructed of any desired material but in the present instance is shown as formed of wood with a lug 5 connected to the front central part and formed with upstanding ears 6 across which a pin 7 may extend and upon which is pivotally mounted the lower end of a front supporting link 8. The base frame 4 is also provided adjacent its rear corners with flanged U-shaped castings 9 secured to the base by any suitable means such as screws 10. Pins 12 extend across the sides of each flanged U-shaped casting and pivotally support the lower ends of rear supporting links 13 which are of such a length as to rest upon and extend outwardly beyond rear vertically extending flange 14 of the flanged U-shaped castings.

The seat portion proper consists of a seat back 16 preferably rigidly connected to a skeleton seat frame 17 upon which rests a cushion 18 preferably secured to a cushion supporting board 19, which latter may be either permanently or removably secured to the skeleton seat frame. The front cross board of the skeleton seat frame has secured thereto adjacent its center lugs 20 having outstanding ears 22 across which extend pins 23 rotatably supported upon the upper end of the front supporting link 8 previously referred to. The rear cross member of the skeleton seat frame has secured thereto adjacent its ends lugs 24 formed with outstanding ears 26 across which extend pins 27 rotatably supported upon the upper ends of rear supporting links 13 previously referred to. In this manner the seat back, skeleton seat frame and cushion are link supported at a plurality of points upon the rotatably mounted seat base. Attention is directed to the fact that by changing the relative lengths of the front and rear supporting links, the normal inclination of the cushion supporting board and, therefore, the cushion surface may be controlled as can also the amount of angular movement permitted. Attention is also particularly directed to the fact that the front and rear supporting links are oppositely directed, thus certain of the forces acting on the links will tend to cancel each other and any mechanism controlling the position of the skeleton seat frame will need to control only the difference in forces acting upon the links.

As clearly shown in the drawings the difference in forces acting upon the supporting links is controlled by means of a mechanism carried by the skeleton seat frame and connected to one of the frame supporting links. As shown, the angular position of the front supporting link is controlled by a clevis 66, pin connected to the front supporting link 8 and to one end of a bell crank 67 rotatably anchored by means of a bracket 68 carried on the front cross member of the skeleton seat frame. The bell crank 67 is also pin connected as at 69 to a lead nut 70 internally threaded and engaging external threads 71 cut on operating rod 72. This rod is rotatably supported in the side members of the skeleton seat frame and has rigidly attached thereto an operating knob 73. Proper adjustment of the seat frame to its normal position is obtained by means of internally threaded thimble 74 and lock nut arrangement connecting the adjacent threaded ends of the two-part operating rod 72. Rotation of the operating knob 73 will cause the lead nut 70 to shift transversely of the seat frame, thereby causing the clevis 66 to move inwardly or outwardly with respect to the operating rod and thus in effect changing the distance between the operating rod and the front supporting link 8. In this manner rotation of the operating knob 73 will cause an angular change in the position of the front supporting link 8, thereby positively controlling the tilting of the seat back and cushion.

It will be seen that the front supporting link 8 is inclined at a greater angle to the horizontal than are the rear supporting links and this is true whether the seat is in a normal or a reclined position. Due to the different and changing angular relationship existing between the supporting links, the horizontal components of the forces acting on the links will be of different magnitude and in opposite directions. The difference in these components must be absorbed by the clevis 66 and its connected operating mechanism. That the clevis can absorb this horizontal thrust and hold the seat in any adjusted position is evident from the drawings, for there can be no relative motion between the supporting link 8 and the seat frame unless the distance between the clevis 66 and operating rod 72 is changed by movement of the lead nut 70 along the operating rod. The provision of the lead nut 70 and bell crank 67 produces a power increasing arrangement permitting the operator to readily adjust the seat position in either direction between the normal and fully reclined position of the seat.

In operating the mechanism it is only necessary for the occupant of the seat to turn the operating knob 73 in the desired direction, thus causing the operating shaft 72 to rotate. Rotation of the operating shaft will cause the lead nut 70 to shift therealong and swing the bell crank 67 around its pivotal connection to bracket 68. Swinging of the bell crank will through clevis 66 positively control the angular position of supporting link 8, thereby controlling the inclination of the seat frame and its connected back.

While the mechanism has been described more or less in detail with specific reference to the drawings, it will be apparent to persons skilled in the art that various modifications and rearrangements of parts may be made and all such modifications and rearrangements of parts are contemplated as will fall within the scope of the appended claims defining our invention.

What is claimed is:

1. A reclining seat comprising in combination, a seat base carried by a supporting structure, a seat frame having a cushion receiving portion, upwardly diverging rigid links pivotally supporting each side of said frame directly upon said base for reclining movement of the frame, and means controllably connecting said seat frame and base to control the reclining movements of said seat frame, said means comprising a bell-crank pivotally connected to one of said links, and screw means connected to said bell crank to cause movement thereof.

2. A reclining seat comprising in combination, a seat base carried by a supporting structure, a seat frame having a cushion receiving portion, upwardly diverging rigid links pivotally supporting each side of said frame upon said base for reclining movement of the frame, a bell-crank pivotally mounted on said seat frame, a clevis connecting said bell-crank and one of said links, and screw actuated means connected to said bell-crank to cause movement thereof thereby controlling the position of the links and the reclining movements of said seat frame.

3. A reclining seat comprising in combination, a seat base carried by a supporting structure, a seat frame having a cushion receiving portion, diverging rigid links pivotally supporting each side of said frame upon said base for reclining movement of the frame, an operating rod rotatably carried by the seat frame, a lead nut having threaded engagement with said rod and movable thereby, a bell-crank pivotally connected to said lead nut and to said seat frame, and a clevis pivotally connected to said bell-crank and to one of said links to control the angular position thereof and thereby control the reclining movements of said seat frame.

4. A reclining seat comprising in combination, a seat base carried by a supporting structure, a seat frame having a cushion receiving portion, a pair of rigid upwardly and outwardly directed rear links each pivotally connected at one end to a point on the seat frame and at the other end to a point on the seat base for supporting the rear side of said seat frame on the base, an upwardly and outwardly directed rigid front link pivotally connected at points on the seat base and seat frame for supporting the front side of said seat frame on the base, said rigid links supporting the frame for reclining movement relative to the base, and means connected with said seat frame and front link to control the reclining movement of the seat frame, said means comprising a bell-crank pivotally connected to said rigid front link, and screw means connected to said bell-crank to cause movement thereof.

5. A reclining seat comprising in combination, a seat base carried by a supporting structure, a seat frame having a cushion receiving portion, upwardly diverging rigid links each pivotally connected at one end to said seat frame and at the other end to said base and supporting said frame upon said base for reclining movement of the frame, a bell crank pivotally mounted on said seat frame, means connecting said bell crank and one of said rigid links, and screw actuated means carried by said seat frame and connected to said bell crank to cause movement thereof thereby controlling the position of the rigid links and the reclining movements of said seat frame.

WILLIAM E. MOREY.
RALPH G. NICHOLS.

(References on following page)

REFERENCES CITED

The following references are of record in the file of this patent:

UNITED STATES PATENTS

| Number | Name | Date |
|---|---|---|
| 1,855,179 | Brownell | Apr. 26, 1932 |
| 2,041,615 | Maslowski | May 19, 1936 |
| 1,756,807 | Black et al. | Apr. 29, 1930 |
| 2,028,633 | Thomas | Jan. 21, 1936 |
| 1,952,376 | Knabusch et al. | Mar. 27, 1934 |
| 2,070,468 | Chapman | Feb. 9, 1937 |

FOREIGN PATENTS

| Number | Country | Date |
|---|---|---|
| 42,408 | France | Apr. 25, 1933 |
| | (Addition to No. 714,601) | |
| 17,266 | England | July 21, 1914 |
| 8,514 | England | June 11, 1888 |
| 31,872 | Germany | June 8, 1885 |
| 355,330 | Germany | June 24, 1922 |
| 22,592 | England | Oct. 14, 1907 |